C. REESE.
Table-Cutlery.
No. 202,757. Patented April 23, 1878.
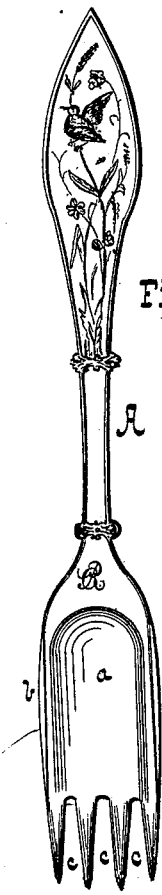
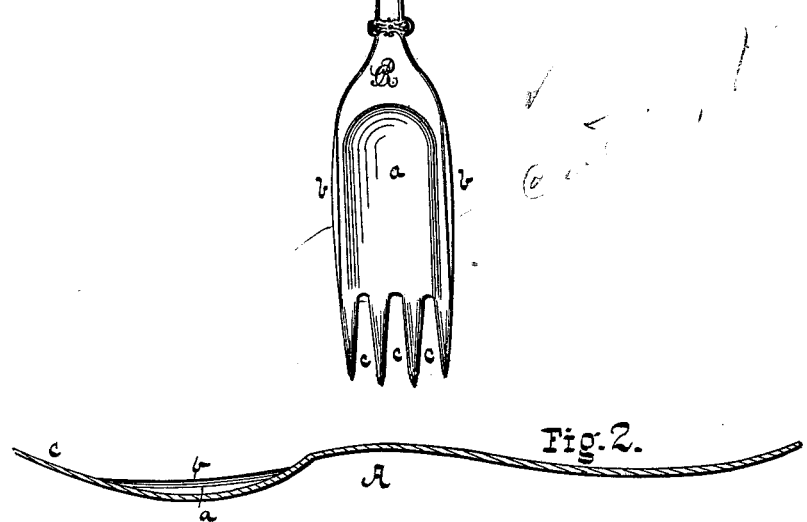
WITNESSES
David G. Weems.
D. L. H. Barclay.
INVENTOR
Chas. Reese.
by R. D. Williams
Attorney.

UNITED STATES PATENT OFFICE.

CHARLES REESE, OF BALTIMORE, MARYLAND.

IMPROVEMENT IN TABLE-CUTLERY.

Specification forming part of Letters Patent No. 202,757, dated April 23, 1878; application filed February 28, 1878.

*To all whom it may concern:*

Be it known that I, CHARLES REESE, of the city of Baltimore, State of Maryland, have invented certain new and useful Improvements in Table-Cutlery; and I hereby declare the same to be fully, clearly, and exactly described as follows, reference being had to the accompanying drawings, in which my improved implement is illustrated, Figures 1 and 2 representing, respectively, plan and sectional views of the same.

My present invention consists in an article of table-cutlery adapted to subserve the various functions of knife, fork, and spoon, as occasion may require.

Except when used to hold meats while being carved, (for which purpose an ordinary two-tined fork is usually employed,) the tines of the table-fork are seldom or never called into play, as such, for more than from one-fourth to one-third of their length, the remaining portions being useless as tines, and not adapted, obviously, to subserve the functions of a spoon. Occasion frequently arises also when it is desirable or necessary to use the fork as a cutting implement, as certain varieties of food, notably such as are served with mustard or vinegar, attack and discolor the steel of the table-knife, while with others, such as pastry or pies, etiquette has tabooed the knife.

In order to furnish a single implement adapted for use as either knife, fork, or spoon, I proceed as follows: A sheet of suitable metal, preferably silver or steel, being cut into a blank of approximately the shape of an ordinary fork, with tines of but about one-third the ordinary length, the same is struck up into the form shown in the drawings. That portion of the blank from the base of the tines nearly to the beginning of the handle is made concave or spoon-shaped, while the edges of the same are sharpened. The device is finally finished in the usual manner by buffing, engraving, and plating, if desired, and if made of base metal.

The implement A thus formed is adapted to subserve the ends above named, as the tines $c$ are of ample length for use as a fork without being long enough to interfere with the use of the device as a spoon, for which latter use the concavity $a$ adapts it.

The sharpening of the edges $b$ in nowise affects the utility of the device, viewed as a fork or spoon, as the sharpening terminates about where the tines begin.

The implement described will be found admirably adapted for use with such articles of food as salads, green corn, pease, &c., which are served with a dressing or gravy of which it is desired to convey with the food a portion to the mouth.

Having thus described my invention, what I claim, and desire to secure by Letters Patent, is—

A spoon having terminal tines and sharpened lateral edges, substantially as described.

CHARLES REESE.

Witnesses:
 R. D. WILLIAMS,
 CHAS. M. BAILEY.